US008958157B2

United States Patent

Rillie et al.

(10) Patent No.: US 8,958,157 B2

(45) Date of Patent: Feb. 17, 2015

(54) DAYLIGHTING TUBE SEGMENT CONNECTION SYSTEMS AND METHODS

(71) Applicant: Solatube International, Inc., Vista, CA (US)

(72) Inventors: David Windsor Rillie, San Marcos, CA (US); Thomas P. Griego, Encinitas, CA (US); Jeffrey S. Robertson, Solana Beach, CA (US)

(73) Assignee: Solatube International, Inc., Vista, CA (US)

( * ) Notice: Subject to any disclaimer, the term of this patent is extended or adjusted under 35 U.S.C. 154(b) by 114 days.

(21) Appl. No.: 13/867,846

(22) Filed: Apr. 22, 2013

(65) Prior Publication Data

US 2014/0268347 A1 Sep. 18, 2014

Related U.S. Application Data

(60) Provisional application No. 61/782,755, filed on Mar. 14, 2013.

(51) Int. Cl.

| | |
|---|---|
| ***G02B 27/00*** | (2006.01) |
| ***F21S 11/00*** | (2006.01) |
| ***E04D 13/03*** | (2006.01) |

(52) U.S. Cl.

CPC ............... *E04D 13/03* (2013.01); *F21S 11/007* (2013.01)

USPC .......................................... 359/593; 359/597

(58) Field of Classification Search

CPC ...................................................... F21S 11/007

USPC .......................................... 359/592–593, 597

See application file for complete search history.

(56) References Cited

U.S. PATENT DOCUMENTS

| | | | | |
|---|---|---|---|---|
| 1,632,254 A | | 6/1927 | Vinogradov | |
| 3,307,303 A | | 3/1967 | Bloxsom | |
| 3,762,664 A | * | 10/1973 | Loveless | 406/182 |
| 4,389,085 A | | 6/1983 | Mori | |
| 4,418,684 A | | 12/1983 | Sanders et al. | |
| 4,706,649 A | | 11/1987 | Hager | |
| 4,761,716 A | | 8/1988 | Mori | |

(Continued)

FOREIGN PATENT DOCUMENTS

| | | |
|---|---|---|
| BE | 1 014 530 | 12/2003 |
| CN | 201090939 Y | 7/2008 |

(Continued)

OTHER PUBLICATIONS

Dulley, James, "Today's Technology and You; Skylight tube solves lighting problems", Illinois Country Living, Apr. 2000.

(Continued)

*Primary Examiner* — Christ Mahoney

(74) *Attorney, Agent, or Firm* — Knobbe, Martens, Olson & Bear, LLP

(57) ABSTRACT

Certain disclosed embodiments provide internally-reflective tube assemblies for use in a tubular daylighting device configured to direct daylight into an interior of a building when installed on a roof of the building. A tube assembly may include multiple tube segments including connection projections, such as hook-type structures, for weaving or otherwise connecting and/or securing tube segments together. In some embodiments, sidewalls of tube segments connected together are substantially parallel to one another at or near the connection region.

20 Claims, 13 Drawing Sheets

(56) References Cited

U.S. PATENT DOCUMENTS

| | | | | |
|---|---|---|---|---|
| 5,117,811 | A | 6/1992 | Taylor | |
| 5,596,848 | A | 1/1997 | Lynch | |
| 5,830,548 | A | 11/1998 | Andersen et al. | |
| 5,878,539 | A | 3/1999 | Grubb | |
| 5,896,713 | A | 4/1999 | Chao et al. | |
| 6,000,170 | A | 12/1999 | Davis | |
| 6,035,593 | A | 3/2000 | Chao et al. | |
| 6,142,645 | A | 11/2000 | Han | |
| 6,219,977 | B1 | 4/2001 | Chao et al. | |
| 6,321,493 | B1 | 11/2001 | Rillie et al. | |
| 6,363,667 | B2 | 4/2002 | O'Neill | |
| 6,363,668 | B2 | 4/2002 | Rillie et al. | |
| 6,412,238 | B2 | 7/2002 | Rillie et al. | |
| 6,415,563 | B2 | 7/2002 | Rillie | |
| 6,438,803 | B2 | 8/2002 | Rillie et al. | |
| 6,502,950 | B2 | 1/2003 | Signer | |
| 6,604,329 | B2 | 8/2003 | Hoy et al. | |
| 6,623,137 | B1 | 9/2003 | Marsonette | |
| 7,040,061 | B2 | 5/2006 | Rillie et al. | |
| 7,082,726 | B2 | 8/2006 | Prenn et al. | |
| 7,146,768 | B2 | 12/2006 | Rillie | |
| 7,159,364 | B2 | 1/2007 | Rillie | |
| 7,168,211 | B2 | 1/2007 | Prenn et al. | |
| 7,757,444 | B1 | 7/2010 | Halliday | |
| 7,957,065 | B2 | 6/2011 | Jaster | |
| 8,082,705 | B2 | 12/2011 | Jaster et al. | |
| 8,132,375 | B2 | 3/2012 | Jaster | |
| 8,205,385 | B2 | 6/2012 | Konstantin | |
| 8,205,386 | B2 | 6/2012 | Konstantin | |
| 8,245,444 | B2 | 8/2012 | Konstantin et al. | |
| 8,376,600 | B2 * | 2/2013 | Bartol et al. | 362/557 |
| 8,555,571 | B2 | 10/2013 | Darmer et al. | |
| 2001/0049916 | A1 | 12/2001 | Rillie et al. | |
| 2005/0128728 | A1 | 6/2005 | Eisenman et al. | |
| 2005/0166490 | A1 | 8/2005 | Darmer et al. | |
| 2005/0188629 | A1 | 9/2005 | Rillie et al. | |
| 2006/0288645 | A1 | 12/2006 | Konstantino et al. | |
| 2007/0163732 | A1 | 7/2007 | Konstantin et al. | |
| 2007/0266652 | A1 | 11/2007 | Jaster et al. | |
| 2009/0113824 | A1 | 5/2009 | Rillie | |
| 2011/0051413 | A1 | 3/2011 | Hand | |
| 2011/0149401 | A1 * | 6/2011 | Jaster | 359/593 |
| 2013/0135744 | A1 | 5/2013 | Jaster | |
| 2013/0314795 | A1 | 11/2013 | Weaver | |
| 2014/0160570 | A1 * | 6/2014 | Jaster | 359/597 |

FOREIGN PATENT DOCUMENTS

| | | | |
|---|---|---|---|
| CN | 101493205 | A | 7/2009 |
| GB | 2 400 885 | | 10/2007 |
| JP | 60142413 | | 9/1985 |
| JP | 60164704 | | 11/1985 |
| JP | 60166906 | | 11/1985 |
| JP | H08 7619 | | 1/1996 |
| JP | 2002 138634 | | 5/2002 |
| JP | 2006-228663 | A | 8/2006 |
| KR | 10-2009-0113435 | | 11/2009 |
| WO | WO 2009-110283 | | 9/2009 |

OTHER PUBLICATIONS

Sunportal, The most innovative building integrated daylighting system, brochure received on Sep. 22, 2011.

* cited by examiner

SEGMENTED TUBE MANUFACTURING

DAYLIGHTING TUBE SEGMENT CONNECTION SYSTEMS AND METHODS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

1. Field

This disclosure relates to tubular daylighting systems and methods.

2. Description of Related Art

Daylighting systems typically include windows, openings, and/or surfaces that provide natural light to the interior of a building. Examples of daylighting systems include skylights and tubular daylighting device installations. Various devices and methods exist for connecting tube segments of a daylighting device together. Certain currently known tubular daylighting systems and methods suffer from various drawbacks.

SUMMARY

In some embodiments, an internally-reflective tube assembly for use in a tubular daylighting device is configured to illuminate an interior space of a building with natural daylight received through a roof-mounted daylight collector. The tube assembly can include a first internally-reflective tube segment. The first tube segment can include a first lower end; first intermittently positioned projections, wherein the first projections extend from the first lower end and are spaced around a perimeter of the first lower end; a first upper end that is closer to a daylight collector of a tubular daylighting device than the first lower end when the first tube segment is positioned to receive daylight from the daylight collector of the tubular daylighting device; and a first tube segment sidewall extending between the first lower end and the first upper end, wherein the first tube sidewall has an interior surface having luminous reflectance greater than or equal to about 98% when measured with respect to CIE Illuminant $D_{65}$.

The tube assembly can include a second internally-reflective tube segment. The second tube segment can include a second upper end and second intermittently positioned projections. The second projections can extend from the second upper end and can be spaced around a perimeter of the second upper end such that the second projections are capable of being woven together with the first projections. A second lower end can be further from the daylight collector of the tubular daylighting device than the second upper end when the second tube segment is positioned to receive daylight from the daylight collector of the tubular daylighting device. A second tube segment sidewall can extend between the second lower end and the second upper end, wherein the second tube sidewall has an interior surface having luminous reflectance greater than or equal to about 98% when measured with respect to CIE Illuminant $D_{65}$. The first tube segment sidewall and the second tube segment sidewall can be substantially parallel when the first projections and the second projections are woven together.

The tube assembly can include a tensioning assembly configured to be applied around a woven connection junction between the first and second tube segments. The tensioning assembly can include a belt portion and a latch portion.

In a tube assembly, the first projections can include hooks configured to interlock with corresponding hooks of the second projections. The first projections and second projections can be configured to be weaved together at least partially through vertical placement of the first tube segment on the second tube segment.

In a tube assembly, the first projections and second projections can be configured to be weaved together at least partially through rotational movement of the first tube segment with respect to the second tube segment about a longitudinal axis of the tube assembly when the first lower end is touching the second upper end.

In a tube assembly, the first lower end includes a first perimeter edge having a first surface generally perpendicular to a longitudinal axis of the first tube segment and the second upper end includes a second perimeter edge having a second surface generally perpendicular to a longitudinal axis of the second tube segment, wherein at least a portion of the first surface is substantially flush with at least a portion of the second surface when the first and second projections are woven together.

Some embodiments provide a method of manufacturing an internally-reflective tube assembly for use in a tubular daylighting device. The method can include forming one or more sheets of at least partially flexible rigid material; and cutting a first tube segment form out of tube sidewall sheet material having first top, bottom, left and right edges. The first tube segment form can include one or more first projections along the first bottom edge. A second tube segment form can be cut out of tube sidewall sheet material having second top, bottom, left and right edges. The second tube segment form can include one or more second projections along the second top edge. The first projections and the second projections are configured to be woven together when the first and second tube segments are bent into a tubular shape.

The first and second tube segment forms have right-edge-to-left-edge dimensions that are substantially equal and uniform over top-edge-to-bottom-edge dimensions of the first and second tube segment forms.

The first projections can include hooks and a belt configured to be wrapped around a connection junction between the first and second tube segments when the first and second tube segment forms are bent into a tubular shape and connected to each other. The belt and the first and second tube segment forms can be made of the same material.

The method of claim 11 a tensioning latch assembly can be configured to securely friction fit the belt around the connection junction.

In certain embodiments, a method of installing an internally-reflective tube assembly in a building having a roof-mounted daylight collector is provided. The method can include positioning a first lower end of a first tube segment such that first lower end touches a second upper end of a second tube segment. The first and second tube segments can have a substantially uniform width through a longitudinal height of both tube segments. The first and second tube segments can be connected at least in part by weaving first projections of the first tube segment with second projections of the second tube segment. When connected, sidewalls of the first and second tube segments can be substantially parallel.

In some embodiments, the first and second tube segments are generally cylindrical. The method can include wrapping a belt around the tube assembly and operating a tensioning member configured to create a secure friction fit between the belt and the sidewalls of the first and second tube segments.

In certain embodiments, an upper end of the first tube segment is positioned to receive daylight through the roof-mounted daylight collector; and the upper end is connected to the daylight collector.

In some embodiments, the second tube segment is connected to a light diffuser positioned inside of the building. The tube assembly can be disposed between a ceiling and roof of a building structure, wherein daylight is permitted to pass from a region exterior to the building to an interior target area through the tube assembly.

Weaving the first and second projections together can include deflecting the first or second projections radially inward or outward.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Any feature or structure can be removed or omitted. Throughout the drawings, reference numbers can be reused to indicate correspondence between reference elements.

DETAILED DESCRIPTION OF CERTAIN EMBODIMENTS

Although certain embodiments and examples are disclosed herein, inventive subject matter extends beyond the examples in the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process can be performed in any suitable sequence and are not necessarily limited to any particular disclosed sequence. Various operations can be described as multiple discrete operations in a manner or order that can be helpful in understanding certain embodiments; however, the order of description should not be construed to imply that these operations are order-dependent. Additionally, the structures, systems, and/or devices described herein can be embodied as integrated components or as separate components. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can be taught or suggested herein.

Tubular daylighting devices (TDD) are designed to capture sunlight from the roof or other exterior portion of a building or structure and channel the light into a target area of the structure, such as an interior room, for providing illumination during daylight hours. In certain embodiments, a TDD includes one or more of the following components: a clear dome disposed on the roof or exterior structure that allows sun to enter therein, but at least partially isolates the target area or interior of the structure or TDD from weather and debris; reflective tubing that channels the light generally downward toward the target area (e.g., an interior ceiling); and a diffuser structure at or near the base of the tube and/or ceiling of the structure interior to promote distribution of the light within the target area. In certain TDD assemblies and/or configurations, the reflective tubing comprises a plurality of tubes or tube segments joined or connected to form a pathway through which light may travel generally in the direction of the target area.

Figure 1:
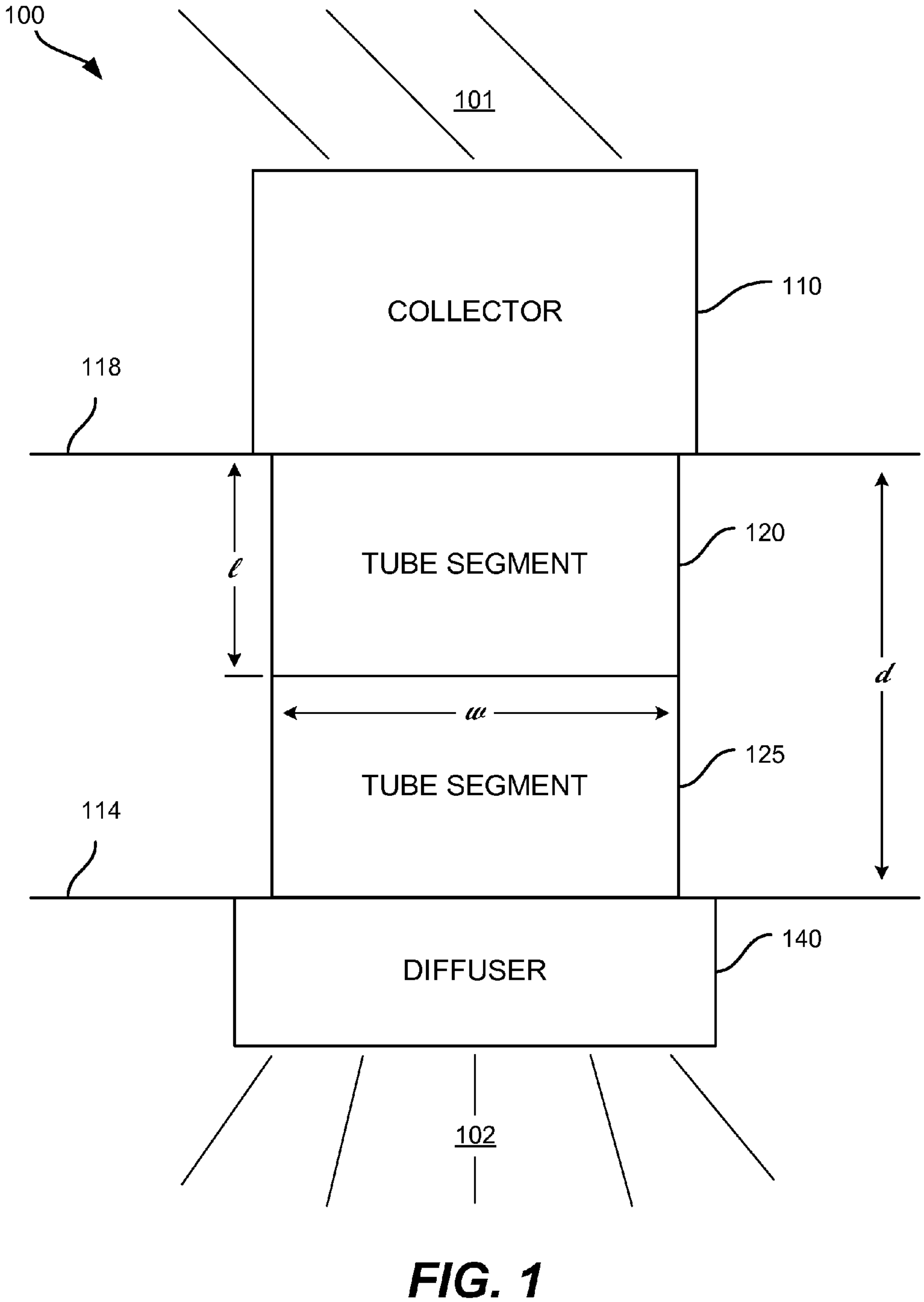
FIG. 1 illustrates a block diagram representing an embodiment of a daylighting device.

FIG. 1 depicts a block diagram representing an embodiment of a passive light-collection and distribution device 100 for providing daylight to a target area of a building or other structure. The device may at least partially incorporate some of the features described above, including segmented tubing for channeling light between the exterior 101 of the structure and the target area 102 within the structure. As shown in FIG. 1, the daylighting device 100 includes a light collector 110 which is exposed, either directly or indirectly to a source of light, such as the Sun. Light enters the light collector 110 through an at least partially transparent cover portion and propagates into segmented reflective tubing (120, 125) that spans a region separating the collector 110 from the diffuser 140. The terms "tube" and "tubing" are used herein according to their broad and ordinary meaning and may include substantially hollow structures having a circular, rectangular, elliptical, or other cross-sectional shape, wherein light may propagate within the hollow interior of the structure. "Tubing" may include any suitable structure or assembly configured to provide a channel, or pathway, between the light collector 110 and a light-aligning structure, or diffuser 140. Furthermore, "tube segment" may refer to a unitary tube structure, or a segment or portion thereof. The interior surface of the tubing (120, 125) is at least partially reflective. In some embodiments, at least a portion of the interior surface of the tube 120 is specularly reflective. Walls and/or surfaces of the tubing (120, 125) can be planar, curved and/or otherwise shaped.

In certain embodiments, an auxiliary lighting system (not shown) can be installed in the daylighting device 100 within the tubing portion (120, 125) to provide light from the tube to the targeted area when daylight is not available in sufficient quantity to provide a desired level of interior lighting.

In the illustrated embodiment, the tubing portion of the daylighting device 100 includes a first tube segment 120 and a second tube segment 125. In certain embodiments, the tube segments 120 and 125 have substantially similar physical dimensions and/or characteristics. The tube segment 120 may include a length dimension, designated in FIG. 1 by the reference "l." For example, the length dimension of the tube segment 120 may extend along a longitudinal axis of the tube segment, and can be a distance parallel with an axis of the tube segment. In an embodiment in which the tube segment 120 is positioned in a substantially vertical alignment, the distance l may represent the height of the tube segment 120. In certain embodiments, the tube segment 120 and/or tube segment 125 have a length l of approximately one to four feet, or longer.

The tube segment 120 may have a width dimension, w, less than approximately 40 inches. For example, the width w can be approximately 10 to 28 inches. The distance w may represent a diameter of a cylindrically-shaped tube or tube segment. In certain embodiments, the tube segment 125 has similar length and/or width dimensions to those of tube segment 120.

Although two tube segments are depicted in FIG. 1, the number of tube segments take make up the tubing portion of the daylighting device 100 can be greater or less than that illustrated. The tubing of the daylighting device 100 may span a distance d between the exterior surface portion (e.g., roof) 118 and the interior surface portion (e.g., ceiling) 114. In certain embodiments, the distance d can be between about three and twelve feet. Therefore, depending possibly on the length of the tube segments used, the interior tubing of the daylighting device 100 may comprise three or more tube segments, wherein the tube segments are connected serially in some manner to span the relevant distance.

Certain embodiments of daylighting devices include a light-aligning structure, or collimator, disposed and configured such that light that would otherwise enter the diffuser 140 at undesirable angles is turned to a more desirable angle. When the daylighting device 100 is installed, the tube segment 125 can be physically connected to, or disposed in proximity to, a collimator, which is configured to turn light propagating through the daylighting device such that, when light exits the daylighting device 100 and/or enters the diffuser 140, the light has increased alignment characteristics, as compared to a device without a collimator. A collimator can be integrated, for example, with the lower tube segment 125, or attached thereto, and may have a shape of a hollow frustum, wherein the width or diameter of the collimator at its base is greater than the width or diameter of the tube segment with which it is associated. For example, in certain embodiments, a collimator helps ensure that light passing through the daylighting device will exit the daylighting device at an exit angle of less than or equal to about 45 degrees from vertical, or at a substantially vertical orientation, when the diffuser 140 is in a horizontal arrangement. In this manner, a collimator may reduce or eliminate glare and visibility issues that light exiting a lighting fixture between those angles can cause.

The diffuser 140 can be configured to spread light from the tube into the room, or target area, in which it is situated. The diffuser 140 can be configured to distribute or disperse the light generally throughout the target area. Various diffuser designs are possible. In certain embodiments, the diffuser 140 is secured to connected to the tubing of the daylighting device 100, such as to the tube segment 125. Though the embodiment depicted in FIG. 1 is described with reference to one or more features or components, certain of the described features or components can be omitted in certain embodiments. Furthermore, additional features or components not described can be included in certain embodiments in accordance with the device shown in FIG. 1.

Figure 2A:
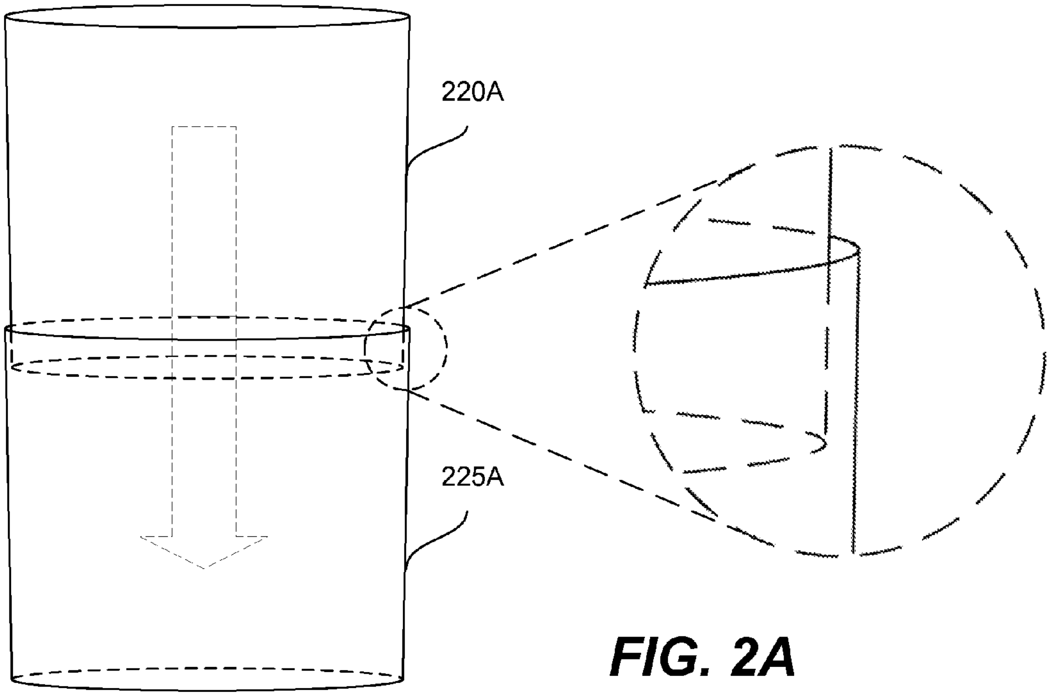
FIGS. 2A and 2B illustrate embodiments of nested tube assemblies.
Figure 2B:
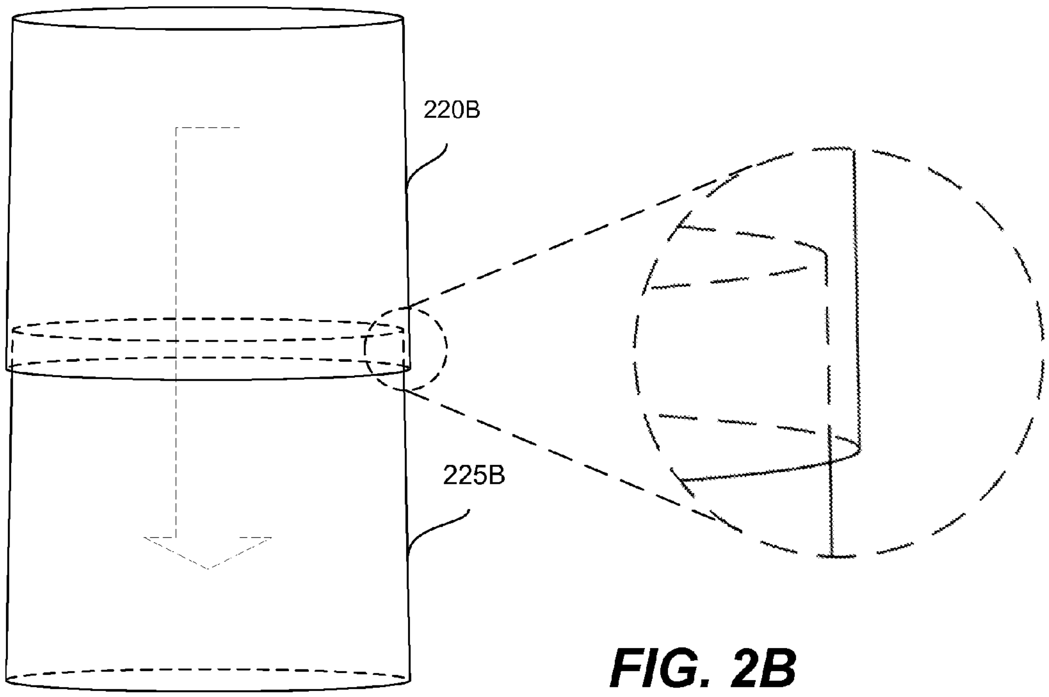

In embodiments utilizing tubing comprising a plurality of separate tube segments, it can be necessary or desirable to secure, attach, or otherwise connect the tube segments together to form an at least partially integrated tubing assembly. One mechanism for connecting tubes or tube segments involves nesting at least a portion of one tube or tube segment into a corresponding portion of another tube or tube segment. FIGS. 2A and 2B illustrate embodiments of nested tube assemblies. As shown in the illustrated embodiments, tube segments (e.g., 220A, 225A) may include tapered end portions, wherein an end of a first tube segment having a relatively smaller opening is inserted at least partially into an end of a second tube segment having a relatively larger opening. In certain embodiments, the distance of overlap joint of the tube segments is approximately 2 inches, for example. Relatively short, or shallow, overlap joints may help minimize materials costs related to tube overlap. In certain embodiments, the tube segments comprise aluminum sheeting, wherein sheet metal screws are used to physically connect the two tubes or tube segments together. The screws, or other tube segment connecting members may cause the walls of the tube segments to be brought together somewhat to improve the connection. Furthermore, a tape, such as an aluminized adhesive backed tape, can be installed at least partially over the exterior joint around the tube perimeter to provide sealing for the joint.

In some embodiments, a tubular daylighting system includes multiple tube segments but does not have a nested tubing configuration, such as, for example, the configurations illustrated in FIGS. 2A and 2B. For example, if the taper is configured such that the larger opening faces generally upward and the smaller diameter generally faces downward, as shown in FIG. 2A, the geometry of the tube walls may cause the elevation angle from horizontal of the daylight to decrease when it reflects off the interior walls of the assembly, resulting in larger number of reflections. In the overlap configuration of the tube assembly shown in FIG. 2A, the interior portion of the assembly faces generally downward. In such configurations, the taper of the lower portion of the tube segment 220A introduces anti-collimating effects into the system. For example, when light propagates through the tube assembly of FIG. 2A in a generally downward direction, as indicated by the dashed arrow, the tapered tube sidewall can cause light incident on the interior surface of the tube in the tapered region to be bent away from a direction parallel to the central axis of the tube. The anti-collimating effect of the taper shown in FIG. 2A can create relatively more reflections as light propagates through the tube assembly than in a tube assembly having substantially vertical sidewalls.

FIG. 2B illustrates a tubing assembly having an upward-facing tube taper (e.g., with the smaller diameter facing up and larger diameter facing down). With respect to the overlap configuration shown in FIG. 2B, wherein the interior portion of the overlap assembly generally faces upward, the overlapping portion may introduce a gap into which light propagating downward through the assembly can be directed, thereby reducing the light transfer efficiency of the assembly. For example, a tapered joint with an approximately 2-inch overlap may present a significant air gap around the tube interior perimeter between the two tube diameters, as shown. In TDD tubing, sunlight may generally travel down the tube in a spiral fashion and at least partially concentrated along the perimeter of the tube, thereby allowing for light to be captured by a gap or ledge around the perimeter and lost.

The overlapping tube segment configurations illustrated in FIGS. 2A and 2B can create a reduction in the light transfer efficiency of a TDD. In addition to the functional drawbacks that can result from the overlapping configurations depicted in FIGS. 2A and 2B, the aesthetic appearance of tape on the tube and/or screws piercing the tube sidewall can be undesirable. For example, certain TDD applications may not have a ceiling and can be suspended from the roof to within 10 to 20 feet from the floor. Such assemblies can be visible to occupants of the structure and therefore the exposed tape and/or sheet metal screws can be viewable as well. Additionally, installation of such assemblies, especially with larger-diameter tubes, may require one person to align and hold the tube while another person is installing the sheet metal screws.

In some embodiments, a tubular daylighting system includes an attachment mechanism for joining multiple tube segments that is economical to manufacture and distribute. For example, reflective tubing can be a significant cost component of a TDD system. As an example, certain embodiments comprise a tube length or approximately 24 inches, and therefore when top and bottom portions of the tube are overlapped by, for example, 2 inches, more than 8% of the tube area can be dedicated to the overlap joint. While the increased overlap distance can provide added rigidity to portions of the tubing assembly, the overlap can also introduce costs. Similar issues can be encountered in joining together air ducts for heating, ventilation, and air conditioning installations, among possibly other applications. Therefore, certain aspects of the present disclosure can be relevant to applications beyond daylighting, such as heating, air conditioning, ventilation, ductwork, fluid conduits, and the like. For example, undesired airflow restrictions or turbulence can be introduced into such systems as a result of duct segment overlapping.

In some embodiments, a tubular daylighting system includes tube segments joined or connected together within a daylighting assembly, wherein the tube segments do not have tapered and/or substantially overlapping regions. In certain embodiments, a tubular daylighting system includes tube segments that have tapered and/or substantially overlapping regions and one or more other features described herein.

Figure 3:
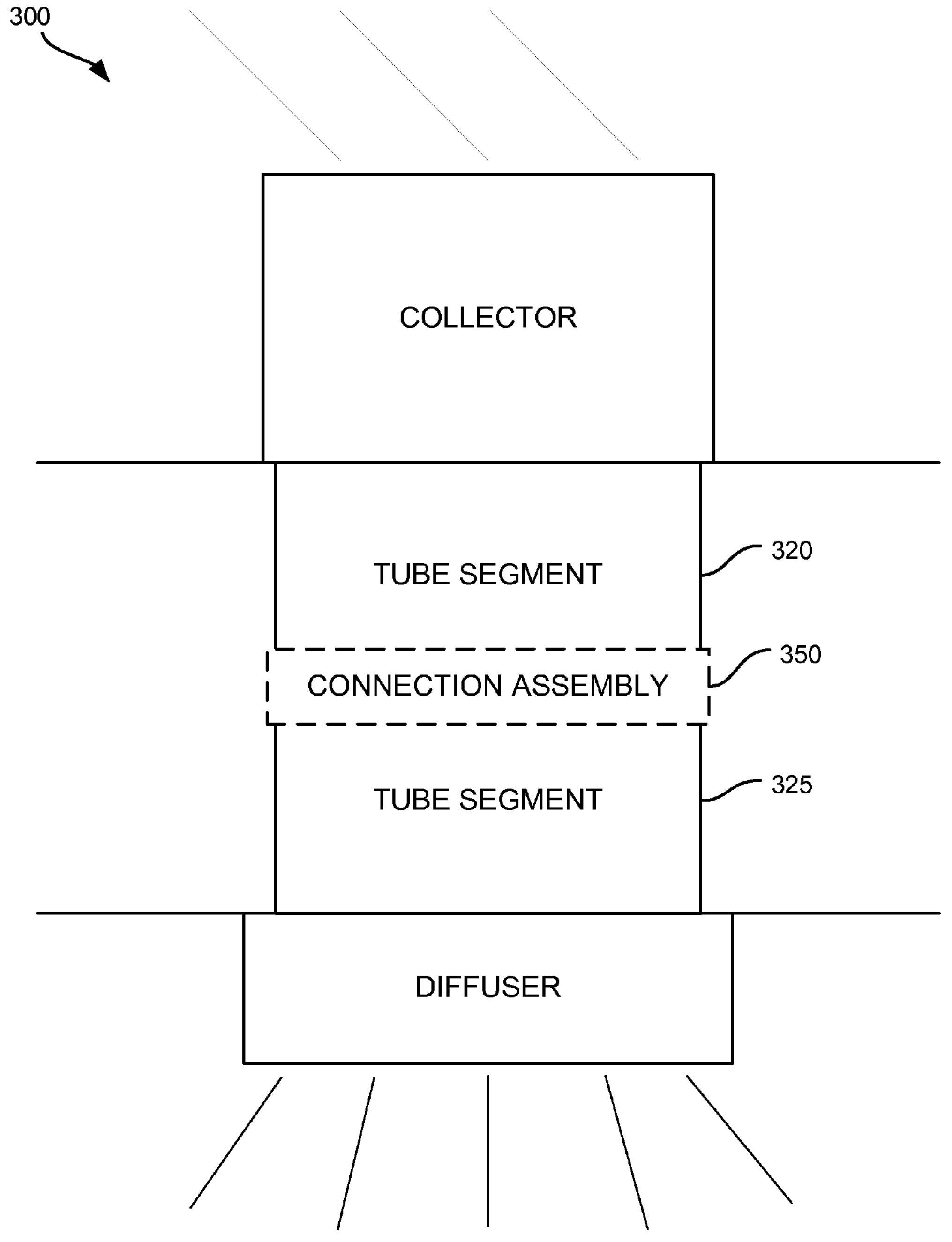
FIG. 3 illustrates a block diagram representing an embodiment of a daylighting device.

FIG. 3 illustrates a block diagram representing an embodiment of a daylighting device 300. The daylighting device 300 includes a daylighting assembly comprising a first internally-reflective tube segment 320 and a second internally-reflective tube segment 325. Certain embodiments disclosed herein utilize non-tapered, or substantially non-tapered, tubes with substantially parallel sides. In such assemblies, the diameter or width of a tube segment can be substantially uniform over a length of the tube segment. For example, the tube segment 320 and tube segment 325 may have diameters that are substantially equal at least in regions where the two tube segments are configured to come together to form a tube assembly. In certain embodiments, the diameter of the tube segments is designed to align with the collector and/or diffuser component to at least partially prevent, substantially reduce, or eliminate decollimation of light, as described above.

The daylighting device 300 may include a connection assembly 350 configured to facilitate connection of the illustrated tube segments to one another. The connection assembly 350 may comprise one or more structures or members configured to secure the tube segments together, which may comprise structures integrated with the tube segments, non-integrated structures, or a combination of integrated and non-integrated features. The connection assembly 350 can be disposed at or near the junction between the first and second tube segments.

Figure 4:
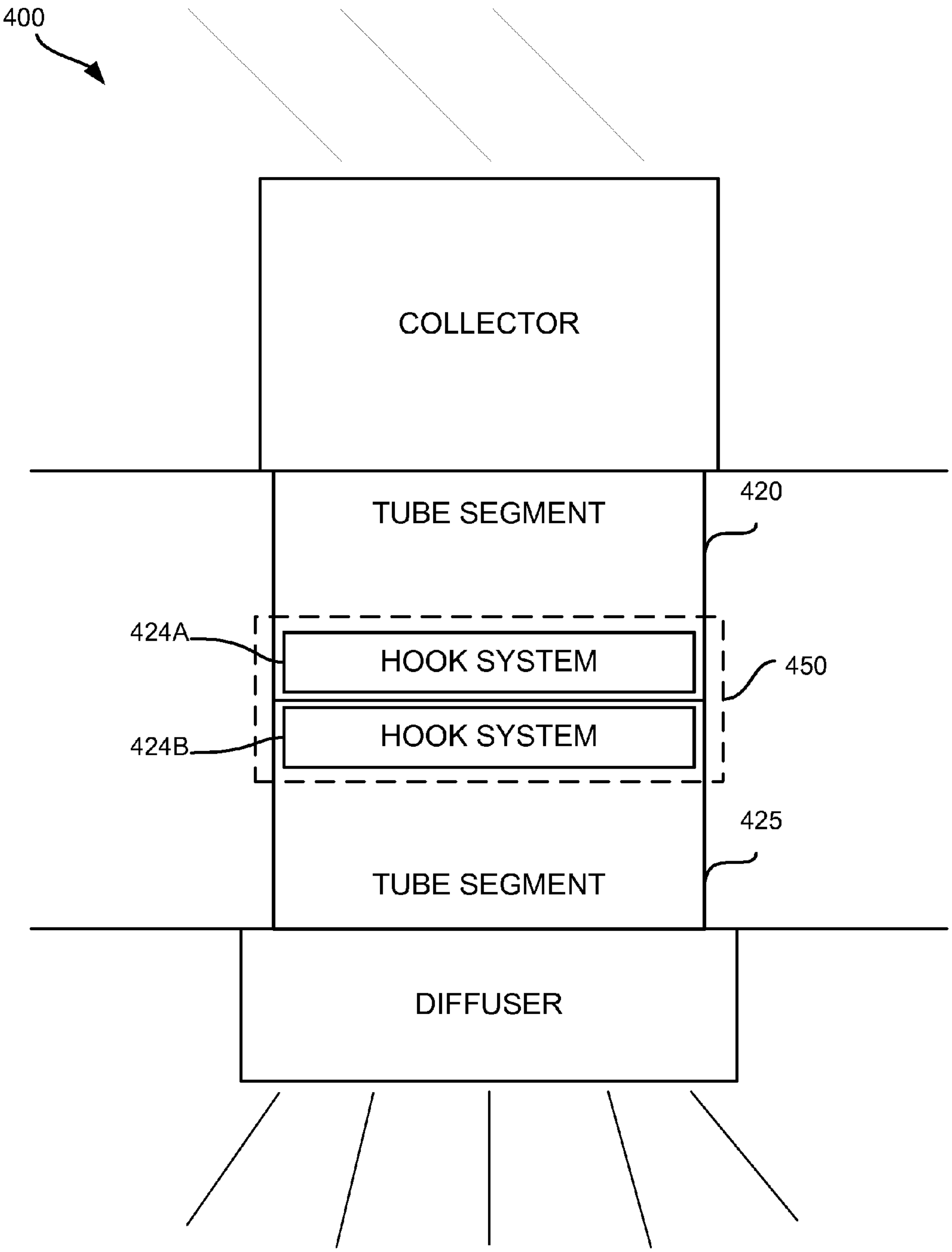
FIG. 4 illustrates a block diagram representing an embodiment of a daylighting device.

FIG. 4 illustrates a block diagram representing an embodiment of a daylighting device including a connection assembly 450 having one or more hook/connection systems associated therewith. The TDD 400 may comprise a proximal side generally proximal to a collector member and representing an upper side or region of the TDD when installed in a generally vertical configuration. The TDD 400 may further comprise a distal region generally distal to the collector/proximal region. A tube assembly may generally extend between the proximal and distal regions of the TDD 400.

The TDD 400 may include connection assemblies at top and/or bottom regions of tube segments connected between the collector and diffuser. In certain embodiments, the hook systems 424A and 424B are integrated with the first and second tube segments (420, 425), respectively. For example, the hook system 424A can include one or more hook or notch-shaped projections or cutouts of the tube segment 420. In certain embodiments, the hook system 424A is configured to be joined or weaved with a corresponding hook or hook system 424B associated with the tube segment 425. The terms "hook" and "hook system" are used herein according to their broad and ordinary meaning and may include latching assemblies, or any structure configured to provide a catch for another structure.

Although FIG. 4 depicts two hook systems, the connection assembly 450 may include any number of hook systems, structures, or other connection members. The number of connection structures selected may affect the efficacy of the connection assembly. For example, increased numbers of hooks may produce increased stability and/or rigidity of the connection between the tube segments. However, increased numbers of hook or other connection structures may increase manufacturing and/or assembly complexity. In certain embodiments, the hook systems include hooks disposed around the perimeter of the tube segments at one or more ends. Hooks that may be associated with the hook systems 424A, 424B are described in greater detail below. In certain embodiments, the connection assembly 450 provides for the connection of the tube segments without requiring tape and/or screws. Certain embodiments, the connection assembly is configured to secure the tube segments together using one or more hook/connection structures, as well as one or more other connection mechanisms, such as tape, screws, or clamps.

Hooks can be formed in the wall of the tube segments. For example, the hooks may comprise cut-out notches in the top and/or bottom of the tubes. The notches can be spaced around the perimeter of the tube. In certain embodiments, the hooks are configured to be weaved together. For example, notches disposed at the edge of one tube can be weaved through the notches of another tube in a manner to provide an approximate alignment of the walls of the two tube segments. In certain embodiments, the connection assembly 450 includes adhesive tape in addition to the hooks.

Certain embodiments disclosed herein provide a mechanical belt that is configured to be wrapped around the perimeter of the tube assembly, such as at the joint region between the tube segments. The belt may provide additional support and/or rigidity to the joint of the tube assembly. With the tube segments positioned flush against one another at their edges, the connection assembly can be substantially void of air gaps at the junction. Without substantial overlap of tube segments, the belt can be desirable to provide increased support to the junction. In addition, or alternatively, embodiments disclosed herein may incorporate various types and forms of staggered slots, adhesives, tapes, sleeves, connective elements, or a combination of elements that provide the connection and/or securing functionality described herein.

In embodiments not requiring tapered tube overlap and/or screws for attachment purposes, the need for tools/drills and/or supplies (e.g., screws and tape) during installation can be reduced or eliminated, thereby potentially reducing installation cost and preparation/staging time. Furthermore, the embodiment of FIG. 4 may require less man power for installation than alternative systems, and may reduce complexity of assembly. In certain embodiments, assembly can be performed by a single person, whereas in other embodiments, two or more people can be required.

The tube segments 420, 425 may be of substantially uniform construction, wherein the tube segments may be interchangeably connected in upper and lower positions. For example, a tube segment may comprise hook systems at both proximal and distal ends of the segment, wherein the proximal and distal hook systems are configured to be woven together, or mate, with each other such that substantially identical tube segments may be woven together or otherwise connected, wherein the proximal end of a first of the tube segments corresponds to the distal end of a second of the tube segments. Furthermore, in certain embodiments, the proximal and distal hook systems are substantially identical, such that ends of the tube segments may be joined together indiscriminately with respect to segment end.

Hook assemblies may also be configured to be connected with diffuser and/or collector members. Alternatively, tube segments configured to be connected directly with a diffuser or collector member may be designed specifically for such connection, wherein the relevant connection assembly differs in some respect from tube segment-to-tube segment connections. In certain embodiments, a tube assembly comprises a first tube segment configured to be connected directly to a collector member, a second tube segment configured to be connected directly to a diffuser member, as well as one or more intermediate tube segments configured to be disposed and connected between two other tube segments.

In certain embodiments, multiple tube segments may be cut from a single sheet of metal or other material, wherein hooks or other connection structures of opposing tube segments fit together in at least partially tessellated configuration. When negative space exists between opposing connection structures, such space may be cut-out or otherwise removed from the sheet.

Figure 5:
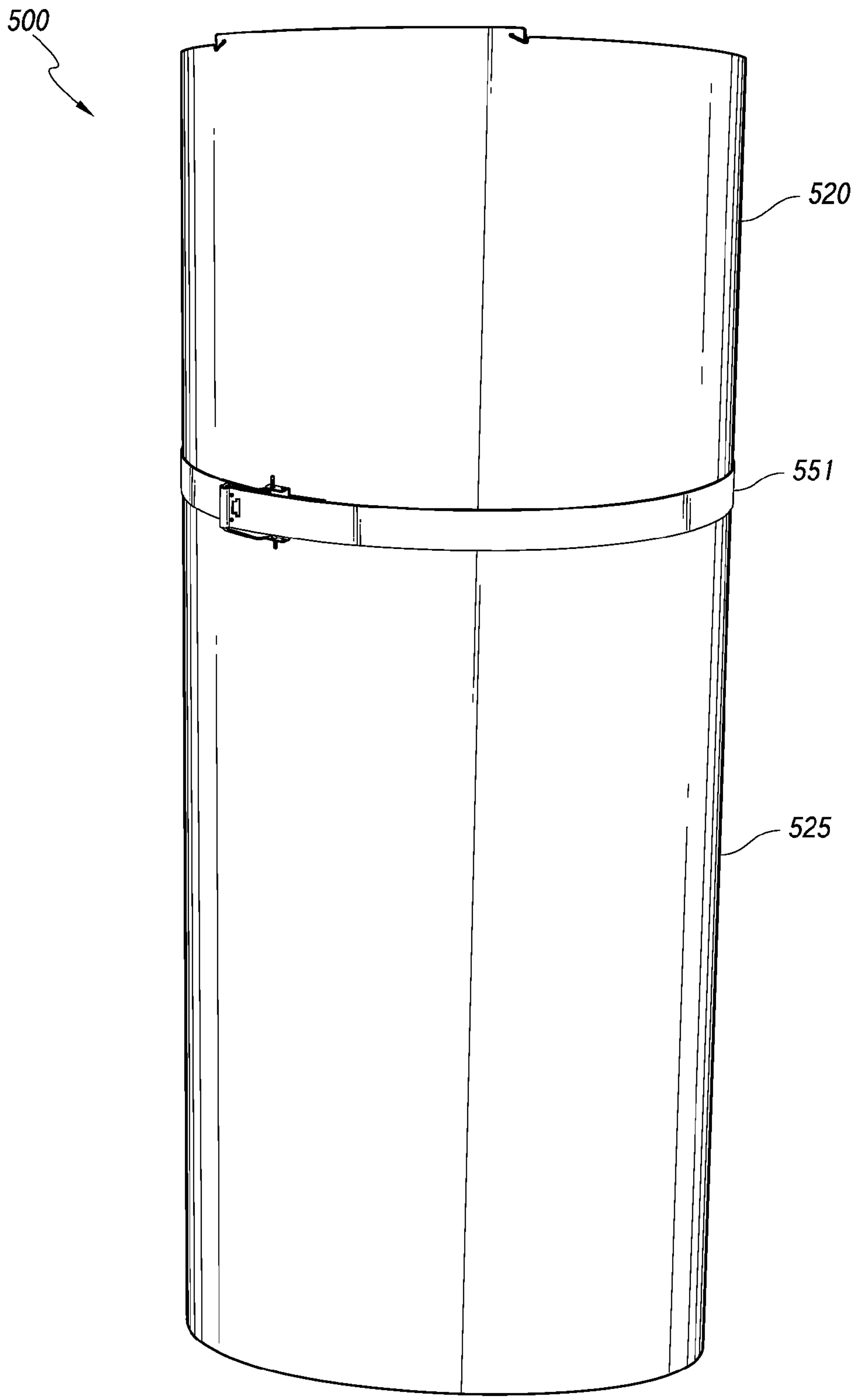
FIG. 5 illustrates a tube assembly in accordance with one or more embodiments disclosed herein.

FIG. 5 illustrates a perspective view of a tube assembly in accordance with one or more embodiments disclosed herein. For example, the illustrated tube assembly 500 can be a representation of the tubing assembly illustrated in FIG. 4 and described above. The tube assembly includes a first tube segment 520 and a second tube segment 525 disposed in a stacked configuration with the first tube segment 520 positioned above and in physical contact with the second tube segment 525. The tube segments depicted have a substantially uniform diameter, such that the walls of the tube segments are at least partially aligned when placed in a stacked configuration.

The tube assembly of FIG. 5 further includes a mechanical belt member 551 wrapped around at least a portion of the tube assembly. In certain embodiments, the belt 551 provides support to the tube assembly and promotes secure connection between the first and second tube segments. The belt 551 can be secured tightly enough around the perimeter of the tube assembly that it serves to draw the sidewalls of the tube segments together at the junction between the two tube segments.

In certain embodiments, the diameters of the tube segments do not taper substantially, such that the tube segments comprise a substantially uniform diameter/width over the length of the tubing, or a portion thereof. The tube assembly 500 can be secured without adhesive and/or screws. In certain embodiments, the tube segments comprise substantially parallel sidewalls at least in a region proximate to the junction between the tube segments. The tube assembly can include a collimating portion or assembly (not shown) having a non-uniform diameter with respect to the diameter of the tube segments at the junction between them.

In certain embodiments, the belt assembly 551, when fastened, does not substantially compress or indent the walls of the tube segments 520, 525 or cause substantial distortion or deformation therein. The belt assembly 551 can be held in position by surface friction forces between the belt and the sidewall of the tubing. Furthermore, adhesive can be utilized to assist in securing the belt in position. In certain embodiments, the sidewalls of the two tube segments are brought together to form a substantially continuous interior surface in at least portions of the interior surface of the tubing over the junction between the two segments.

In the tubing assembly 500 of FIG. 5, one or more of the tube segments may comprise a highly-reflective interior surface (not shown). For example, an interior tube surface may be substantially specularly reflective. Furthermore, the tubing interior may provide luminous reflectance of greater than approximately 90%, such as greater than approximately 98%, or even 99%, when measured according to CIE Standard Illuminant $D_{65}$.

Figure 6:
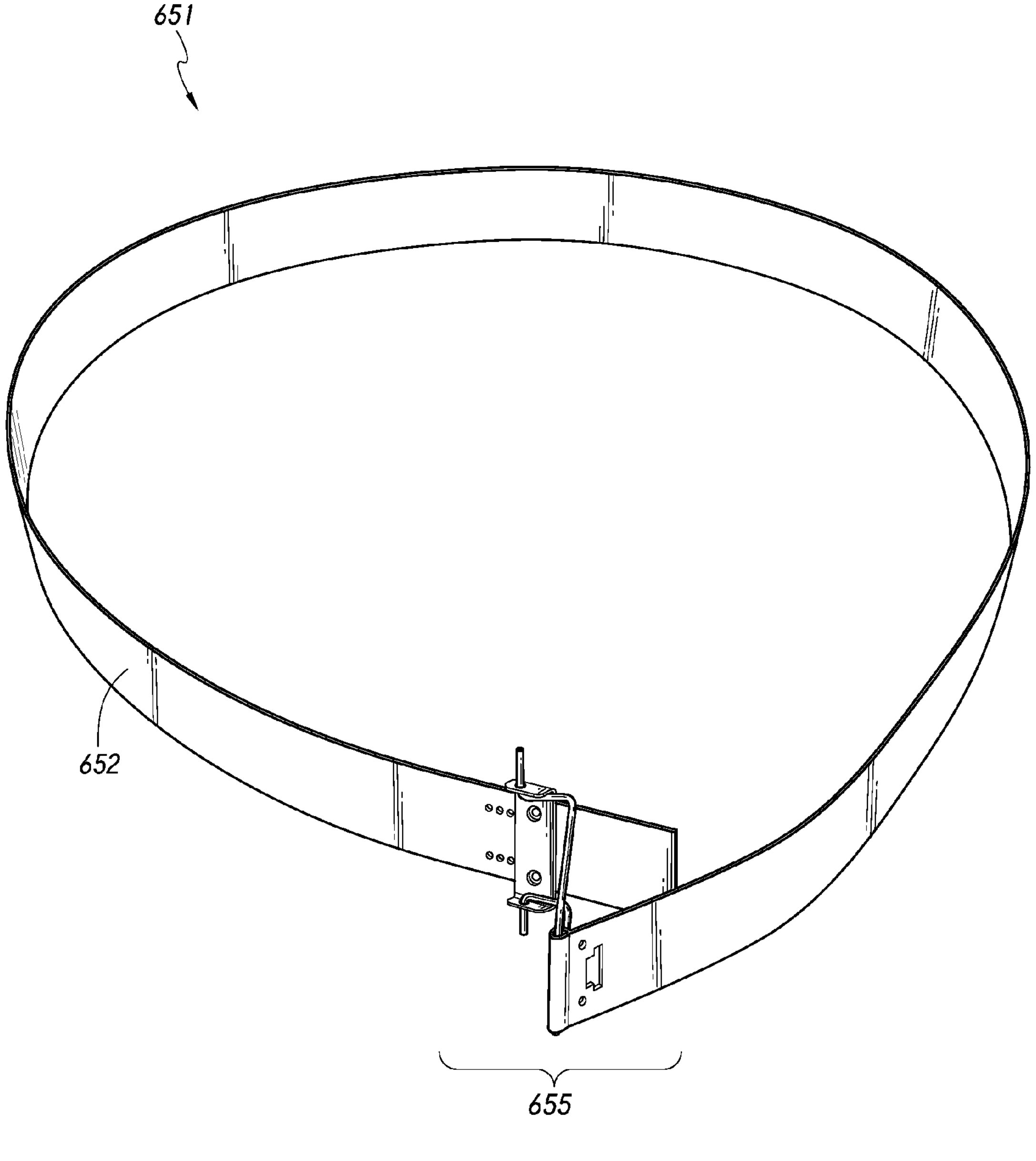
FIG. 6 illustrates a perspective view of an attachment belt assembly in accordance with one or more embodiments disclosed herein.

FIG. 6 illustrates a perspective view of an attachment belt assembly 651 in accordance with one or more embodiments disclosed herein. The belt assembly 651 can be similar to the belt assembly 551 illustrated in FIG. 5. The belt assembly 651 may include a body portion 652 configured to be wrapped or positioned around the perimeter of a tube assembly at a junction region between two tube segments. The belt assembly 651 may further include a latch or fastening portion 655, which includes portions of both ends of the belt assembly, wherein portions of both ends of the belt are brought together and fastened in some manner in order to secure the belt assembly in an at least partially closed loop.

The body and/or fastener portions of the belt assembly 651 may comprise metal, such as aluminum, plastic, paper, or other material. In certain embodiments, the belt body is at least partially rigid. Furthermore, the belt body 652 can be at least partially flexible, such that it can be shaped around a tube assembly and fit substantially flush against the outer walls of the assembly. The fastener portion 655 can be adjustable for achieving a desirable amount of tightness when in a fastened configuration around the tube assembly. While the embodiment shown in FIG. 6 can be particularly suited to be secured around a tube assembly having a substantially circular or elliptical cross-sectional shape, in certain embodiments, the belt assembly 651 can be configured to be wrapped around other shapes, such as rectangular tube assemblies. For example, the belt body 652 may include one or more bends, creases, or hinges, such that the belt can be fitted against angled tube regions, or can be malleable enough such that bends/creases can be formed therein through the application of manual force.

Figure 7:
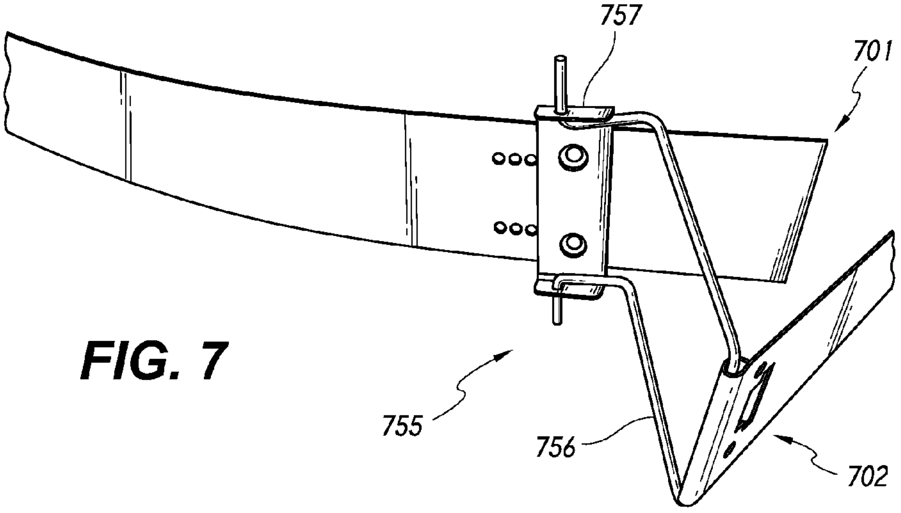
FIG. 7 illustrates an up-close view of the fastener portion of the belt assembly of FIG. 6 in accordance with one or more embodiments disclosed herein.

FIG. 7 illustrates an up-close view of the fastener portion of the belt assembly of FIG. 5 in accordance with one or more embodiments disclosed herein. The fastener 755 may comprise a tensioning bar 756 configured to connect a first end portion 701 of the belt with a second end portion 702. The tensioning bar 765 can be removably attached to one or more of the ends, wherein the bar can be manually removed from one or more of the ends. For example, as shown, the bar can be removably attached to the first end 701, wherein pin portions 759 of the bar are configured to fit within corresponding receptacles in the first end portion 701, or in a structure 757 secured thereto. Pressure applied to a certain portion or portions of the tensioning bar 756 may allow for the withdrawal of the pin(s) from the receiving holes. In certain embodiments, the tensioning bar 756 is secured in such a manner that it may not be easily removed without deforming the bar and/or other connection structures associated with the fastener 755. In an alternative embodiment, the fastener 755 includes a latch that is configured to hook and unhook from one end of the belt.

The belt fastener 755 is depicted in FIG. 7 in an open, or unlocked, position. In such a configuration, the diameter presented by the belt when wrapped around a tube assembly may not be fixed, wherein the end portions of the belt may move relative to one another within a certain range of movement without substantial restriction imposed on such movement by the fastener assembly 756. Such range of movement may allow for the end portion(s) of the belt to be brought into a closed, or locked, position as illustrated in further detail below with respect to FIG. 8.

The fastener 755 may include a secure adjustment member 757 that can be adjustably repositioned in order to provide a desirable degree of tightness when in a closed position. For example, as shown, the adjustment member may comprise a rigid structure 757 having mating projections (not shown) projecting from the structure 757 that can be secured to corresponding female receptacles in the first end portion 701 of the belt. Alternatively, the end portion 701 of the belt may comprise one or more male projection members configured to be received in corresponding female receptacles in the adjustment member 757. In certain embodiments, the adjustment member can be manually detached and/or repositioned with respect to the end portion 701 of the belt. In certain embodiments, the adjustment member is a fixed structure, wherein adjustable tension is achieved through latching a tension member onto one of a plurality distributed latch hooks and/or holes.

Figure 8:
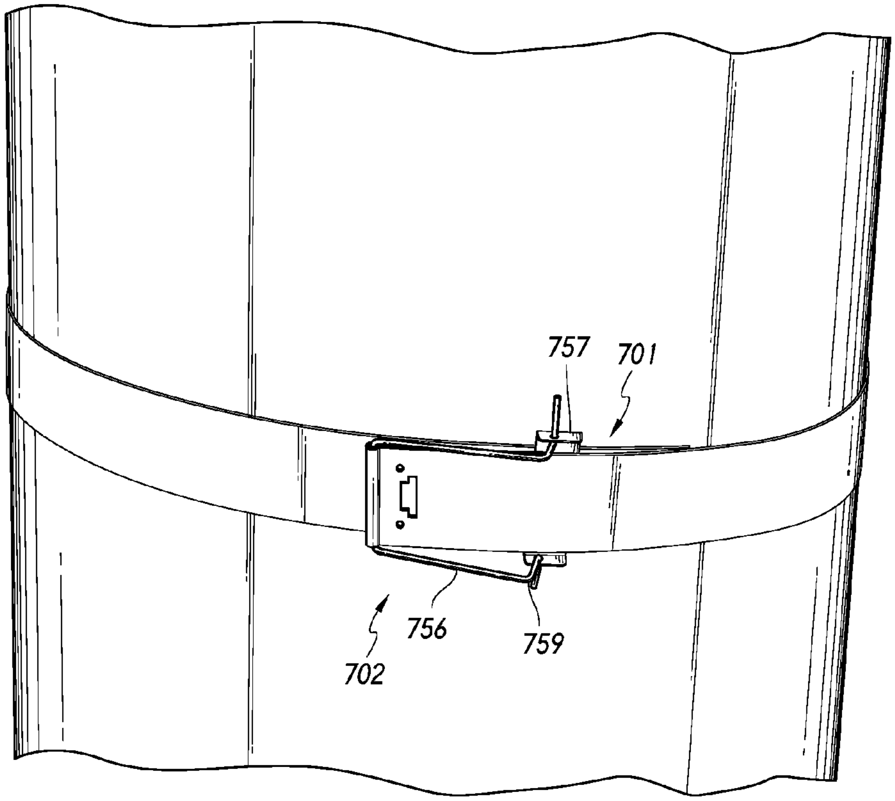
FIG. 8 illustrates an up-close view of a fastener portion of the belt assembly of FIG. 6 in accordance with one or more embodiments disclosed herein.

FIG. 8 illustrates an up-close view of a fastener portion of the belt assembly of FIG. 5 in accordance with one or more embodiments disclosed herein. The tensioning bar 756 has been pulled into a closed, secured position. A bend or other feature 759 in the tensioning bar 756 may exert force on the distal portion of the tensioning bar and end portion 702 of the belt such that the fastener can be maintained in the closed position without manual force being applied thereto. Friction and/or other forces may also serve to secure the fastener in the closed position. In certain embodiments, force applied to the tensioning bar and/or end portion 702 radially outward from the axis of the tube assembly and/or in a backward direction may cause the fastener to be returned to an open position, or partially open position. For example, such force may cause the tensioning bar to rotate counter-clockwise, or otherwise, about a secure connection point until the fastener assumes an open position, as described above with respect to FIG. 7. In certain embodiments, when the belt is in a closed position, friction forces may hold the belt securely such that it does not slide substantially against the surface of the tube assembly without significant rotational force being applied thereto.

As described above, certain embodiments may provide for tube assemblies comprising tube segments connected together by weaving the perimeter of a tube inside and outside of a corresponding tube perimeter through, for example, j-shaped notches on the end of the tube segments. Each tube may have alternating notches around the perimeter that are configured to slide into the corresponding j-notches of the corresponding tube segment that are facing the opposite direction.

Figure 9:
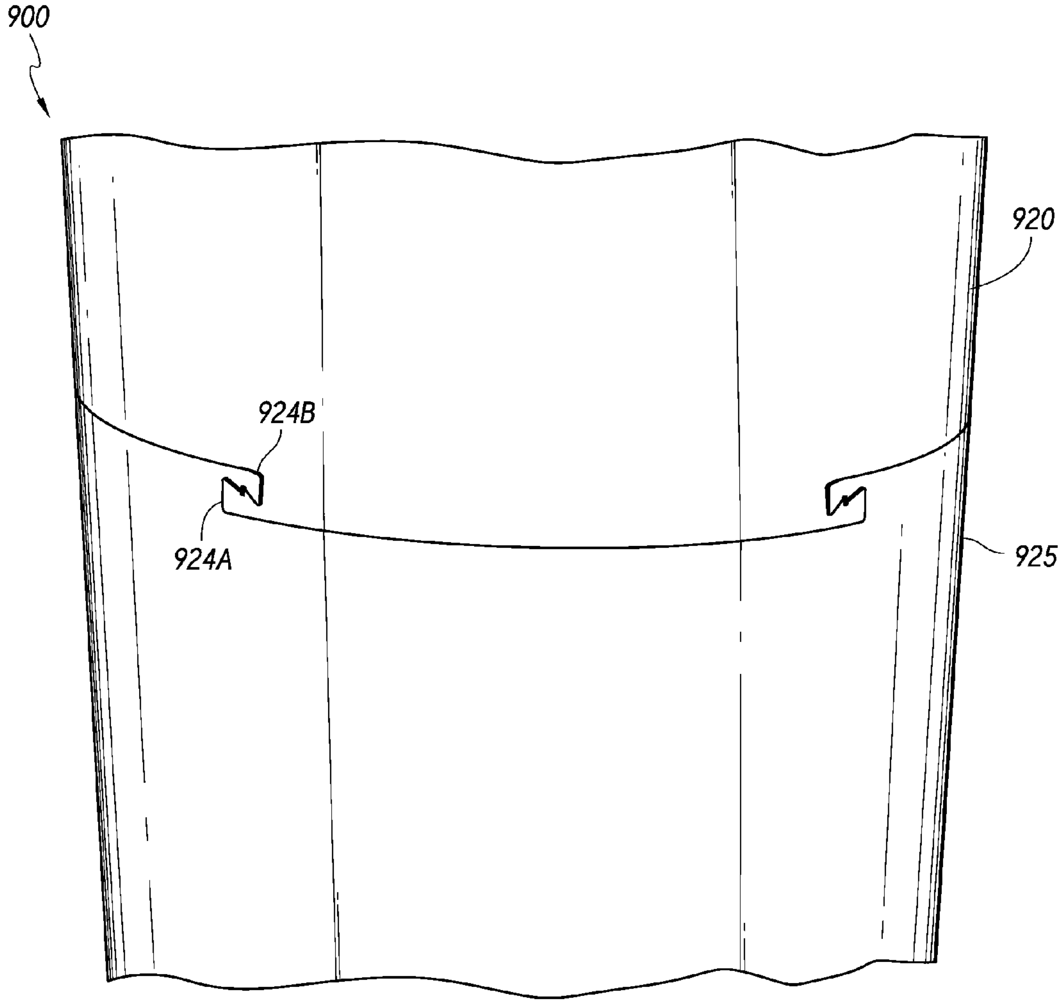
FIG. 9 illustrates a tube assembly in accordance with one or more embodiments disclosed herein.

The notches and hooks can be designed to hold the tubes together without using screws or adhesive tape during the process of assembling a tubular daylighting device in the field. FIG. 9 illustrates a tube assembly in accordance with one or more embodiments disclosed herein, wherein tube segments are secured to one another without a belt assembly fastened thereon. In certain embodiments, a belt assembly as described herein can be secured around at least a portion of the junction between the two tube segments 920, 925 in order to provide added stability and rigidity. The tube assembly 900 includes tube segments 920, 925 having a plurality of hook members associated therewith. In certain embodiments, the hook members 924A and 924B are integrated with the first and second tube segments (920, 925), respectively. For example, the hook 924A can be a hook or notch-shaped projection or cutout of the tube segment 920. In an assembled configuration, the hooks of the respective tube segments are configured to be joined or weaved with corresponding hooks (e.g., hooks 924A and 924B) being linked together. In certain embodiments, the connection assembly 450 provides for the connection of the tube segments without requiring tape and/or screws.

In certain embodiments, the walls of the connected tube segments are configured such that when the hooks are interlocked, the walls of the upper segment rest on the walls of the lower segment. For example, the edges of the walls can be substantially flush with one another, rather than overlapping or providing gaps between, around the perimeter of the tubing. A belt assembly may help hold the segments in close proximity in order to reduce the formation of gaps. In certain embodiments, cutout projections of the edge of the tube segments can be flexed outward such that they at least partially overlap with the opposing tube.

The hooks can be configured to provide rotational catch functionality, wherein once two opposing hooks of connected tube segments have been woven together, relative rotational movement of the tube segments is restricted at least in the direction each of the respective hooks is facing. For example, with respect to the depicted embodiment shown in FIG. 9, the hook 924B of the upper tube segment can be said to face in a clockwise direction, wherein when the two hooks 924A and 924B are connected, such connection restricts or prevents movement by the upper tube segment 920 in a clockwise direction. Furthermore, in certain embodiments, tube segments comprise hooks that face in opposing directions along the circumference, or perimeter, of the tube segment, such that combined forces introduced by the opposing hook connections restricts or prevents relative rotational movement in either direction between the tube segments. The hook connections may also restrict or prevent the tube segments from being pulled apart in an axial direction, or pushed together beyond the range permitted by the hook notches.

In certain embodiments, the hooks are self-aligning, wherein the hooks provide a guide for securing the tube segments in a locked position. Such a configuration may provide simplified installation. Hooks may be configured to interlock in connection with the lowering of an upper tube segment onto a lower segment, wherein relative vertical displacement/movement allows for hooks to become engaged. In certain embodiments, hooks become engaged at least partly through radial weaving of the structures. The hooks may bow or deflect inwardly or outwardly to allow for interweaving of hooks.

While certain embodiments are described herein in the contest of hook connection structures, connection assemblies in accordance with the present disclosure may comprise any suitable or desirable connection structure. In certain embodiments, tube segment edge portions weave together in some manner to secure the tube segments together. For example, tube segment edge portions may radially overlap with one another, wherein edge portions are configured to deflect inwardly or outwardly to allow for such radial overlap. Such deflection may allow for secure mating of tube segments without substantial vertical nesting. Certain embodiments disclosed herein provide for woven connection of tube segments, wherein sidewalls of the tube segments are substantially parallel. In certain embodiments, edge projections alternatingly deflect inwardly and/or outwardly. Weaving of tube edge portions may provide radial stops, or catches, for preventing or reducing radial and/or longitudinal (or vertical) movement or displacement. As described above, the tube assembly can include a tensioning assembly applied around at least a portion of the perimeter of the tube assembly, such as substantially around the region of the woven connection.

In certain embodiments, tube segments have connection hooks associated with both ends of the segment, wherein the tube segment can be connected to another tube segment at either end, or both. For example, the tube segment 920 can be configured such that both ends of the tube present similar hook connection arrangements, wherein the tube segment can be flipped substantially indiscriminately and connected and connected to the tube segment 925 in either the flipped or un-flipped position.

While the depicted embodiment of FIG. 9, as well as certain other embodiments disclosed herein, may be related to tubing having a generally cylindrical cross-sectional shape, tubing assemblies may have any suitable or desirable cross-sectional shape, including possibly irregular shapes and dimensions.

Figure 10A:
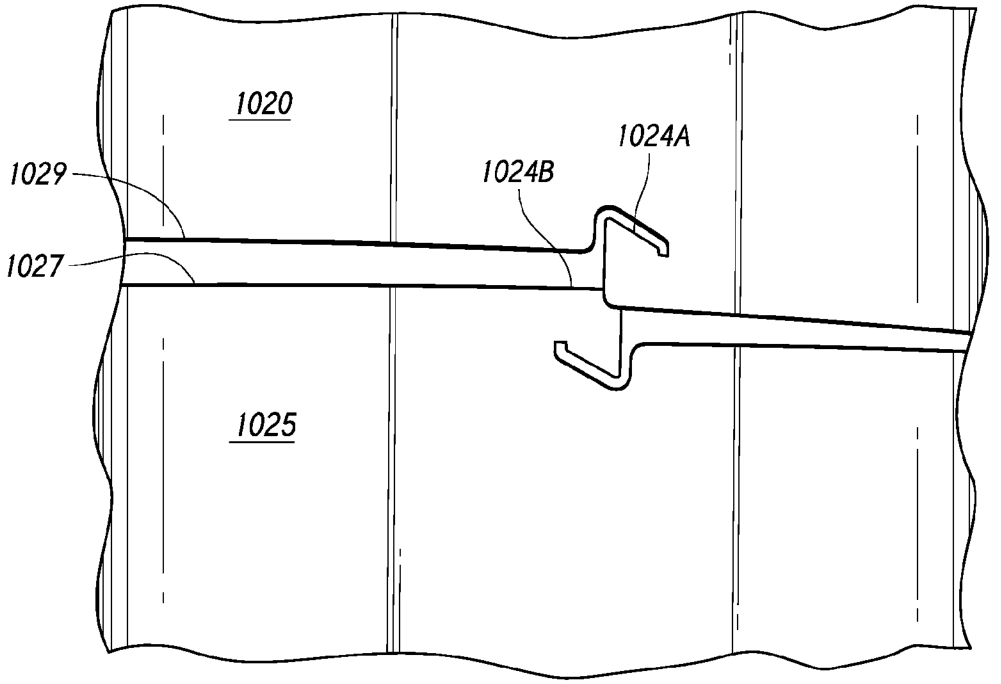
FIGS. 10A and 10B illustrate close-up views of hooks of a tube assembly in accordance with one or more embodiments disclosed herein.
Figure 10B:
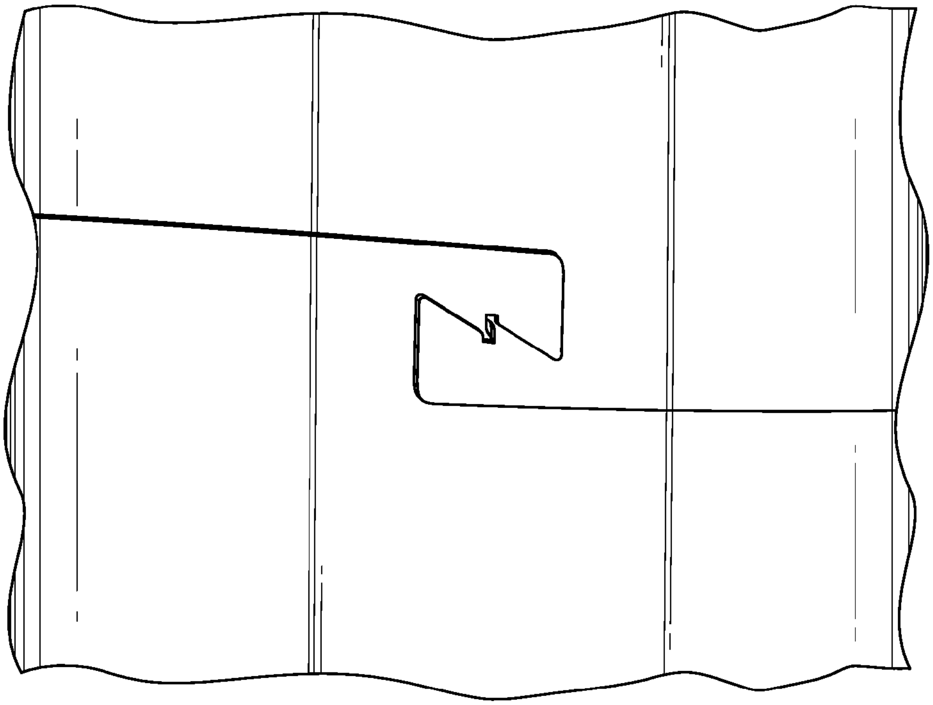

FIGS. 10A and 10B illustrate close-up views of securing members of a tube assembly in accordance with one or more embodiments disclosed herein. The hooks can be formed in the wall of the tube segments. For example, the hooks may comprise cut-out notches in the top and/or bottom of the tubes. While the cut-out notches are j-shaped in the illustrated embodiment, such notches can be any suitable shape (for example, elliptical or rectangular slots for aligning the tube edge or j-shaped notches for locking the tube segments in place). The notch and hooks can be formed by cutting out end portions of metal sheets that are wrapped together to form tubes or tube segments.

In certain embodiments, the hooks are configured to be weaved together. For example, notches disposed at the edge of one tube can be weaved through the notches of another tube in a manner to provide an approximate alignment of the walls of the two tube segments. In certain embodiments, the hooks and notches are configured such that the edges of the adjoined tube segments do not substantially overlap, with the possible exception of the hook portions themselves. For example, the extended edge 1027 and the recessed edge 1029 of the opposing tube segment can be positioned flush against one another when the tube segments are interlocked. Such features may provide reduced loss of light compared to daylighting systems incorporating tapered and overlapped tubes. In certain embodiments, the extended edge 1027 is permitted to flex outward slightly to accommodate some amount of overlap of the extended edge over the recessed edge 1029. When such overlap exists, a mechanical fastening belt as described above can be secured over the overlapping edge in order to substantially eliminate any gaps within the tube that might otherwise be caused by tube overlap, as discussed above. The thickness of the interior edge can present a surface substantially perpendicular to the axis of the tube, wherein light can be reflected or otherwise misdirected or absorbed by such surface. FIG. 10B shows the hooks of FIG. 10A in an interlocked arrangement. When the tube segments are in the interlocked arrangement, a belt assembly can be tightly coupled to the tube segments by a single person installing the tubing. As described above, the hook connections may provide increased rigidity to the tube assembly due, at least in part, to the overlapped hook portions.

Figure 11:
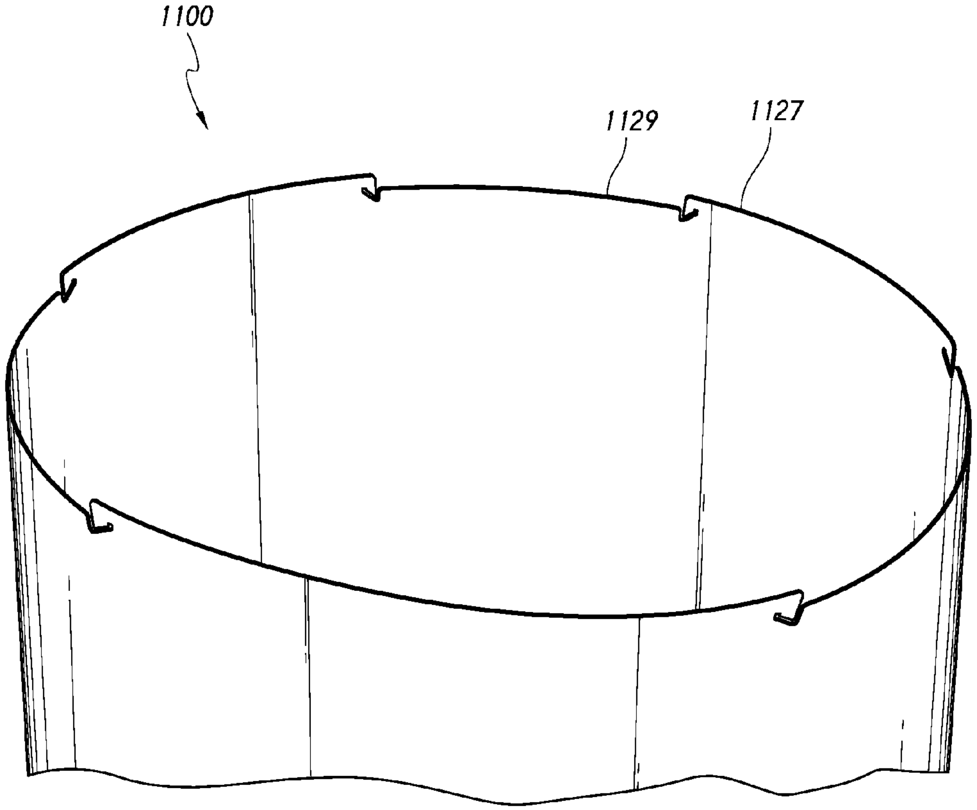
FIG. 11 illustrates a perspective view of a portion of a tube segment in accordance with one or more embodiments disclosed herein.

FIG. 11 illustrates a perspective view of a portion of a tube segment 1100 in accordance with one or more embodiments disclosed herein. The edge of the tube segment 1100 has hook and notch structures associated therewith and positioned around the perimeter of the tube. In certain embodiments, the hooks are arranged around the tube perimeter facing in alternating directions. The tube edge can be at least slightly elevated on one side of a hook relative to the other side of the hook. Therefore, the alternating directionality of the hooks may present alternating extended lip portions 1127 and recessed portion 1129. In certain embodiments, the tube segment 1100 is designed such that alternating hooks and projections/recesses in a replica, or substantially similar, tube segment can be aligned and interlocked with the hooks shown. In certain embodiments, the two tube segments' inner reflective walls alternate at a junction portion as the tube segments weave around the perimeter. The depth of the notch may serve to maintain the vertical registration of the tube.

The connector structures can be evenly spaced along the tube perimeter, or may have uneven spacing. In certain embodiments the circumferential distance between opposite-facing hooks is greater than the circumferential distance between hooks facing each other, or vice versa. In certain embodiments, hooks are evenly spaced approximately 60° apart, as shown. In certain embodiments, the tube segment 1100 comprises four hooks or other connection structures evenly spaced about the perimeter of the tube approximately 90° apart.

Figure 12:
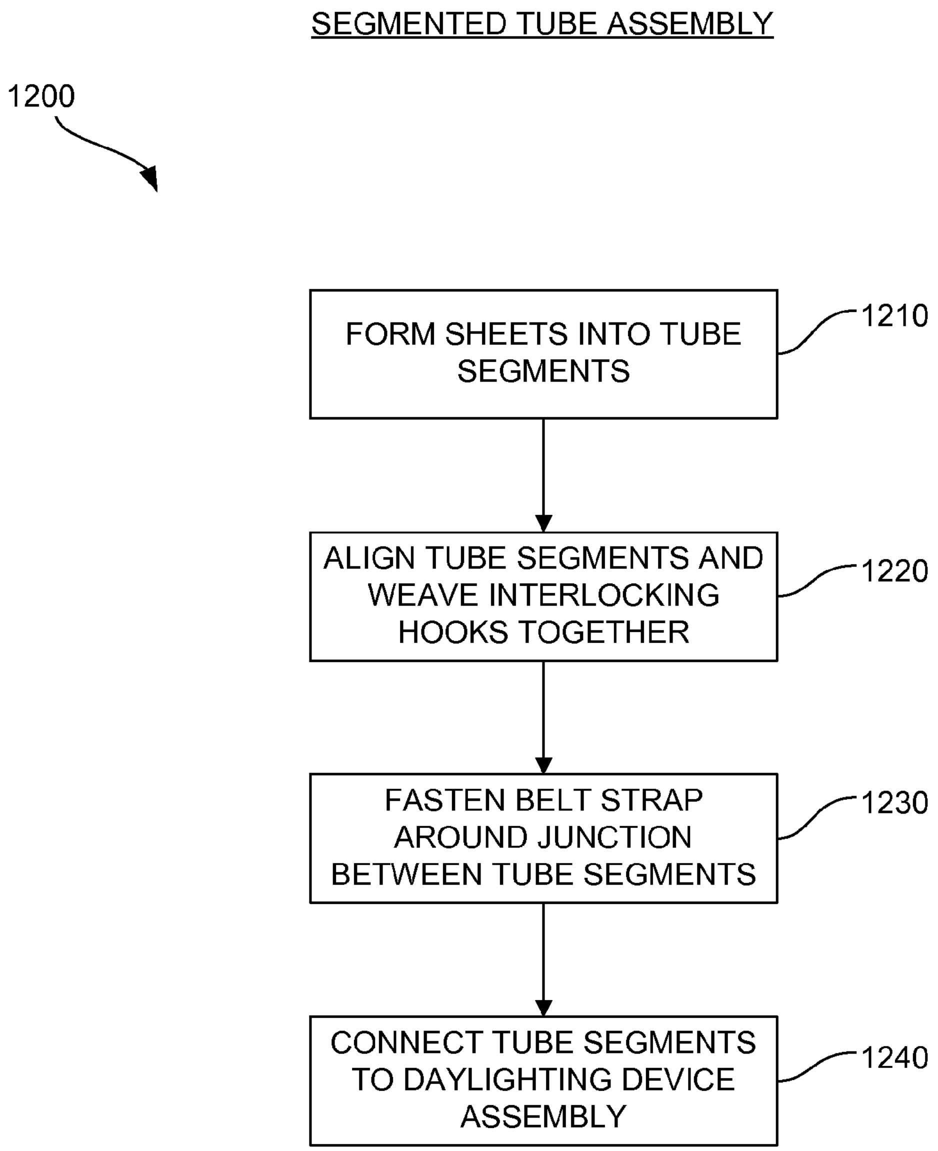
FIG. 12 is a flowchart illustrating an embodiment of a process for installing a segmented daylighting tube.

FIG. 12 is a flowchart illustrating a process 1200 for assembling a segmented daylighting tube. The process 1200 may include forming and/or joining one or more sheets of material, such as aluminum or other at least partially flexible material into tube segments. For example, unassembled tube segments can be shipped or otherwise transported as substantially flat sheet in order to facilitate compact transport. At block 1220 of the process 1200, formed tube segments are aligned connected together by weaving the perimeter of the tube inside and outside of the tube segments through j-shaped notches on the end of the tubes, as described above. For example, tube segments may have alternating notches around the perimeter that will slide into the other tube's j-notch that is facing the opposite direction. Interlocking the tube segments as described herein may provide an approximate alignment of the two tubes walls such that the tube walls may form a substantially continuous interior tube surface, thereby promoting light transfer efficiency.

After the notched tube connections have been completed, a metal belt is installed around the perimeter at the two-segment junction, tightened, and/or fastened to provide added stability and to promote the formation of a substantially continuous reflective inner tube surface by the two interlocked segments for efficient light transfer down the tube. The additional caliper of the belt also provides a more rigid region at the two-segment junction. Such additional stability can be beneficial, particularly with respect to large-diameter assemblies and/or assemblies formed primarily of thin metal sheeting or other thin materials.

Figure 13:
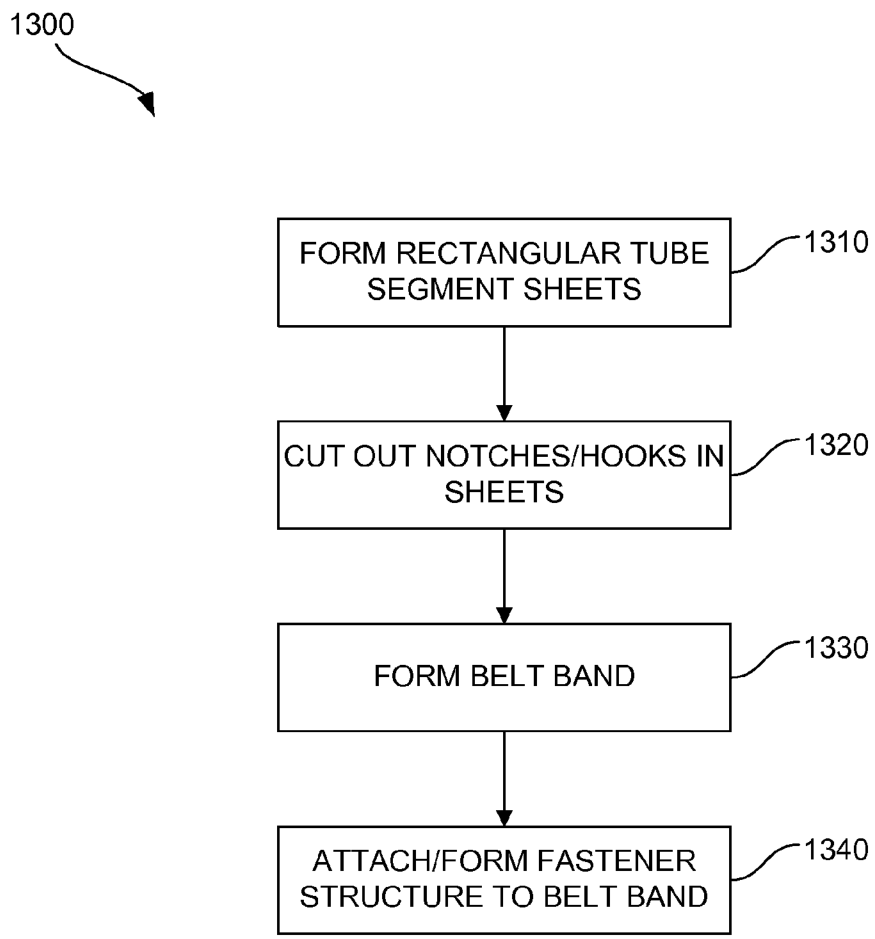
FIG. 13 is a flowchart illustrating an embodiment of a process for manufacturing a daylighting tube segment.

FIG. 13 is a flowchart illustrating an embodiment of a process 1300 for manufacturing a daylighting tube segment for use in one or more daylighting assemblies described herein. The process 1300 may include forming rectangular tube segment sheets, such as out of aluminum or other at least partially flexible material. The sheets are then cut to form notches and hooks, or other connection structure integrated with the sheets. At block 1330, a belt band may formed out of metal or another material capable of exerting compressive force around the perimeter of the tube segment. The ends or other portions of the belt can be attached to belt fastener structure, such as a buckle-type member, tensioning bar or strap, or the like. The belt may also have perforations or other structural features. Such features can be used to secure the fastener structure or otherwise facilitate belt tightening and/or fastening.

At least some of the embodiments disclosed herein may provide one or more advantages over existing lighting systems. For example, certain embodiments effectively allow increased daylight capture through the use of tubing connections without necessarily requiring the use of tube tapering, overlap, screws, and/or tape.

Discussion of the various embodiments disclosed herein has generally followed the embodiments illustrated in the figures. However, it is contemplated that the particular features, structures, or characteristics of any embodiments discussed herein can be combined in any suitable manner in one or more separate embodiments not expressly illustrated or described. It is understood that the fixtures disclosed herein can be used in at least some systems and/or other lighting installations besides daylighting systems.

In the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Thus, it is intended that the scope of the inventions herein disclosed should not be limited by the particular embodiments described above.

What is claimed is:

1. An internally-reflective tube assembly for use in a tubular daylighting device configured to illuminate an interior space of a building with natural daylight received through a roof-mounted daylight collector, the tube assembly comprising:

a first internally-reflective tube segment comprising:

a first lower end;

first intermittently positioned projections, wherein the first projections extend from the first lower end and are spaced around a perimeter of the first lower end;

a first upper end that is closer to a daylight collector of a tubular daylighting device than the first lower end when the first tube segment is positioned to receive daylight from the daylight collector of the tubular daylighting device; and a first tube segment sidewall extending between the first lower end and the first upper end, wherein the first tube sidewall has an interior surface having luminous reflectance greater than or equal to about 98% when measured with respect to CIE Illuminant $D_{65}$; and a second internally-reflective tube segment comprising:

a second upper end;

second intermittently positioned projections, wherein the second projections extend from the second upper end and are spaced around a perimeter of the second upper end such that the second projections are capable of being woven together with the first projections;

a second lower end that is further from the daylight collector of the tubular daylighting device than the second upper end when the second tube segment is positioned to receive daylight from the daylight collector of the tubular daylighting device; and a second tube segment sidewall extending between the second lower end and the second upper end, wherein the second tube sidewall has an interior surface having luminous reflectance greater than or equal to about 98% when measured with respect to CIE Illuminant $D_{65}$;

wherein the first tube segment sidewall and the second tube segment sidewall are substantially parallel when the first projections and the second projections are woven together.

2. The tube assembly of claim 1, further comprising a tensioning assembly configured to be applied around a woven connection junction between the first and second tube segments.

3. The tube assembly of claim 2, wherein the tensioning assembly comprises a belt portion and a latch portion.

4. The tube assembly of claim 1, wherein the first projections comprise hooks configured to interlock with corresponding hooks of the second projections.

5. The tube assembly of claim 1, wherein the first projections and second projections are configured to be weaved together at least partially through vertical placement of the first tube segment on the second tube segment.

6. The tube assembly of claim 1, wherein the first projections and second projections are configured to be weaved together at least partially through rotational movement of the first tube segment with respect to the second tube segment about a longitudinal axis of the tube assembly when the first lower end is touching the second upper end.

7. The tube assembly of claim 1, wherein the first lower end includes a first perimeter edge having a first surface generally perpendicular to a longitudinal axis of the first tube segment and the second upper end includes a second perimeter edge having a second surface generally perpendicular to a longitudinal axis of the second tube segment, wherein at least a portion of the first surface is substantially flush with at least a portion of the second surface when the first and second projections are woven together.

8. The tube assembly of claim 1, wherein the first tube segment and the second tube segment have sidewalls that at least partially overlap and that are not tapered when the first tube segment and the second tube segment are connected together.

9. A method of manufacturing an internally-reflective tube assembly for use in a tubular daylighting device, the method comprising:

forming one or more sheets of at least partially flexible rigid material;

cutting a first tube segment form out of tube sidewall sheet material having first top, bottom, left and right edges, wherein the first tube segment form comprises one or more first projections along the first bottom edge;

cutting a second tube segment form out of tube sidewall sheet material having second top, bottom, left and right edges, wherein the second tube segment form comprises one or more second projections along the second top edge;

wherein the first tube segment is configured to attach to a roof-mounted daylight collector of the tubular daylighting device;

wherein the first projections and the second projections are configured to be woven together when the first and second tube segments are bent into a tubular shape; and wherein the first and second tube segment forms have right-edge-to-left-edge dimensions that are substantially equal and uniform over top-edge-to-bottom-edge dimensions of the first and second tube segment forms.

10. The method of claim 9, wherein the first projections comprise hooks.

11. The method of claim 9, further comprising forming a belt configured to be wrapped around a connection junction between the first and second tube segments when the first and second tube segment forms are bent into a tubular shape and connected to each other.

12. The method of claim 11, wherein the belt and the first and second tube segment forms are made of the same material.

13. The method of claim 12, further comprising connecting a tensioning latch assembly configured to securely friction fit the belt around the connection junction.

14. A method of installing an internally-reflective tube assembly in a building having a roof-mounted daylight collector, the method comprising:

positioning a first lower end of a first tube segment such that first lower end touches a second upper end of a second tube segment, wherein the first and second tube segments have a substantially uniform width through a longitudinal height of both tube segments, and wherein the first and second tube segments are positioned to receive daylight from the roof-mounted daylight collector; and connecting the first and second tube segments at least in part by weaving first projections of the first tube segment with second projections of the second tube segment;

wherein, when connected, sidewalls of the first and second tube segments are substantially parallel.

15. The method of claim 14, wherein the first and second tube segments are generally cylindrical.

16. The method of claim 14, further comprising wrapping a belt around the tube assembly and operating a tensioning member configured to create a secure friction fit between the belt and the sidewalls of the first and second tube segments.

17. The method of claim 14, further comprising:

positioning an upper end of the first tube segment to receive daylight through the roof-mounted daylight collector; and connecting the upper end to the daylight collector.

18. The method of claim 14, further comprising connecting the second tube segment to a light diffuser positioned inside of the building.

19. The method of claim 14, further comprising disposing the tube assembly between a ceiling and roof of a building structure, wherein daylight is permitted to pass from a region exterior to the building to an interior target area through the tube assembly.

20. The method of claim 14, wherein weaving the first and second projections together includes deflecting the first or second projections radially inward or outward.

* * * * *